(12) United States Patent
Kikuchi et al.

(10) Patent No.: US 7,852,069 B2
(45) Date of Patent: Dec. 14, 2010

(54) ROTARY ANGLE DETECTOR

(75) Inventors: Yoshimi Kikuchi, Nagano (JP); Kanji Kitazawa, Nagano (JP); Hisashi Mimura, Nagano (JP); Masahito Okada, Nagano (JP); Yonezo Kubota, Nagano (JP)

(73) Assignee: Tamagawa Seiki Kabushiki Kaisha, Nagano (JP)

( * ) Notice: Subject to any disclaimer, the term of this patent is extended or adjusted under 35 U.S.C. 154(b) by 472 days.

(21) Appl. No.: 11/921,149

(22) PCT Filed: Apr. 24, 2007

(86) PCT No.: PCT/JP2007/058829
§ 371 (c)(1),
(2), (4) Date: Nov. 28, 2007

(87) PCT Pub. No.: WO2008/010338
PCT Pub. Date: Jan. 24, 2008

(65) Prior Publication Data
US 2009/0289622 A1 Nov. 26, 2009

(30) Foreign Application Priority Data
Jul. 19, 2006 (JP) .............................. 2006-196580

(51) Int. Cl.
*G01B 7/30* (2006.01)
(52) U.S. Cl. .............................. 324/207.25; 324/207.17
(58) Field of Classification Search ........................ None
See application file for complete search history.

(56) References Cited

U.S. PATENT DOCUMENTS 5,637,997 A * 6/1997 Hore et al. ............. 324/207.16

7,569,964 B2 * 8/2009 Ijima ........................ 310/194

(Continued)

FOREIGN PATENT DOCUMENTS

EP          795738          10/2001

(Continued)

OTHER PUBLICATIONS

International Search Report issued May 22, 2007 in the International (PCT) Application of which the present application is the U.S. National Stage.

*Primary Examiner*—Jay M Patidar
(74) *Attorney, Agent, or Firm*—Wenderoth, Lind & Ponack, L.L.P.

(57) ABSTRACT

An angle detector including an annular stator board (1); a plurality of stators (5) provided on the annular stator board (1) independently of one another and forming slots (10) at constant or various intervals; a magnetic core (11) formed on surfaces of the stators (5); stator windings (4) formed around the magnetic cores (11) and composed of excitation windings (4a) and output windings (4b); a magnetic flux return path plateau (12) provided on each of the surfaces of the stators (5) and provided inward or outward of the stator windings (4); an annular rotor board (6) provided on the magnetic flux return path plateaus (12); and a gap forming board (13) provided on an inner surface (6a) of the annular rotor board (6) and having a board inner surface (13a) whose protrusion state changes according to a waveform. The annular rotor board rotates to cause changes in a gap (14) between each of the magnetic cores (11) and the board inner surface (13a) of the gap forming board (13).

5 Claims, 7 Drawing Sheets

U.S. PATENT DOCUMENTS

2004/0085063 A1   5/2004   Jin et al.
2004/0239207 A1*  12/2004  Kloepzig et al. ............ 310/254

FOREIGN PATENT DOCUMENTS

| JP | 8-292066 | 11/1996 |
| JP | 2003-202240 | 7/2003 |
| JP | 2005-181348 | 7/2005 |

* cited by examiner

ROTARY ANGLE DETECTOR

BACKGROUND OF THE INVENTION

1. Technical Field

The present invention relates to an angle detector, and more particularly, to a novel improvement for obtaining an ultrathin construction thereof, including providing stator windings on a plurality of stators disposed on an annular stator board via slots, and providing the stators with an annular rotor board via a gap so that the annular rotor board can rotate face to face with the stators so as to allow detection of an angular signal from a change in a gap resulting from rotation of the annular rotor board.

2. Description of Related Art

Figure 4:
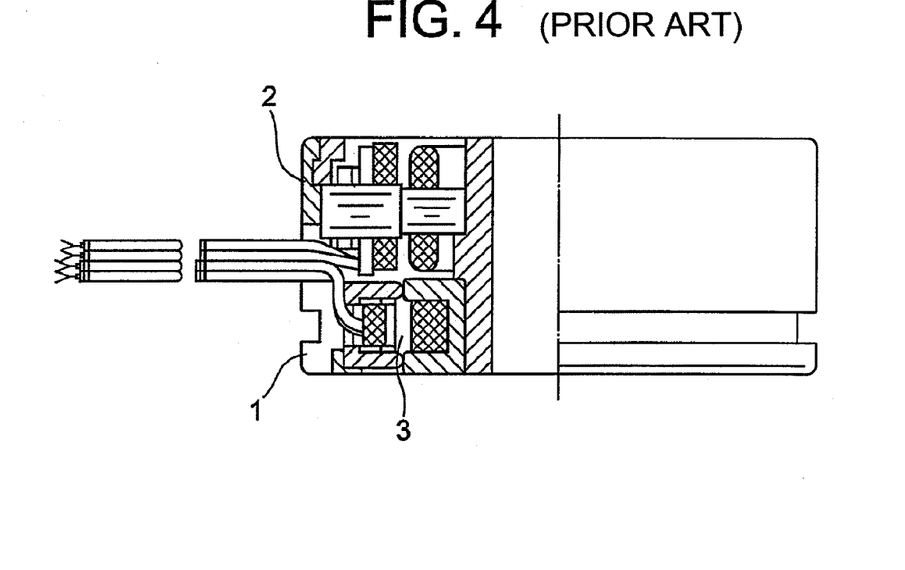
FIG. 4 is a half-sectional view showing a conventional resolver.
Figure 5:
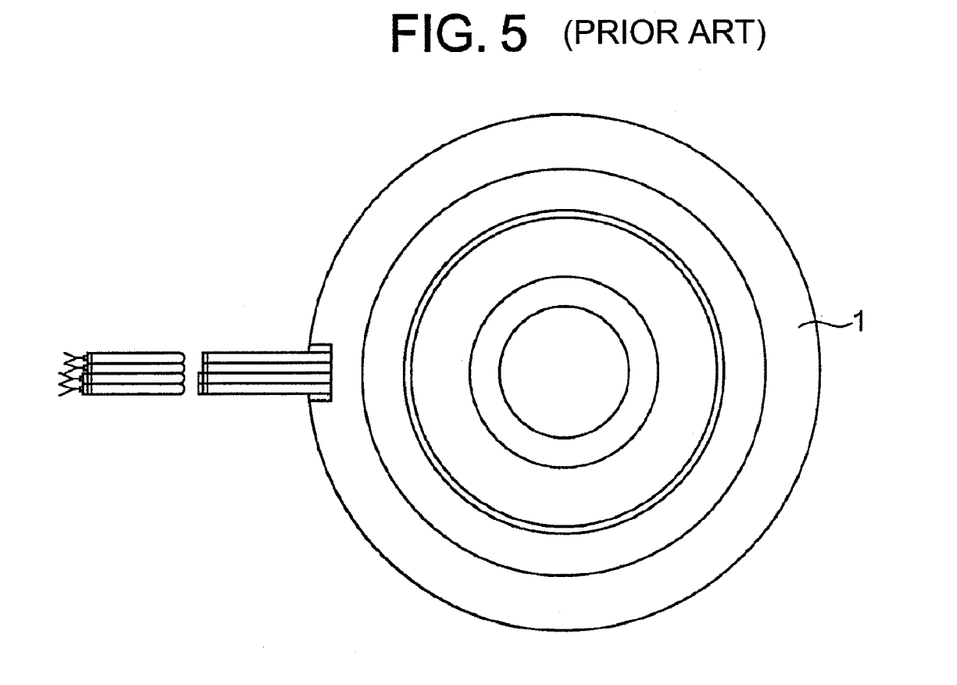
FIG. 5 is a plan view of FIG. 4.

As this kind of thin resolver that has been conventionally used, a construction using a rotary transformer shown in FIGS. 4 and 5, and a construction of a variable reluctance-type resolver of U.S. Pat. No. 5,920,135 shown in FIG. 6 can be mentioned.

That is, a resolver portion 2 and a rotary transformer portion 3 are so disposed as to be superposed on each other along an axial direction within a casing 1 of the conventional construction shown in FIGS. 4 and 5.

Figure 6:
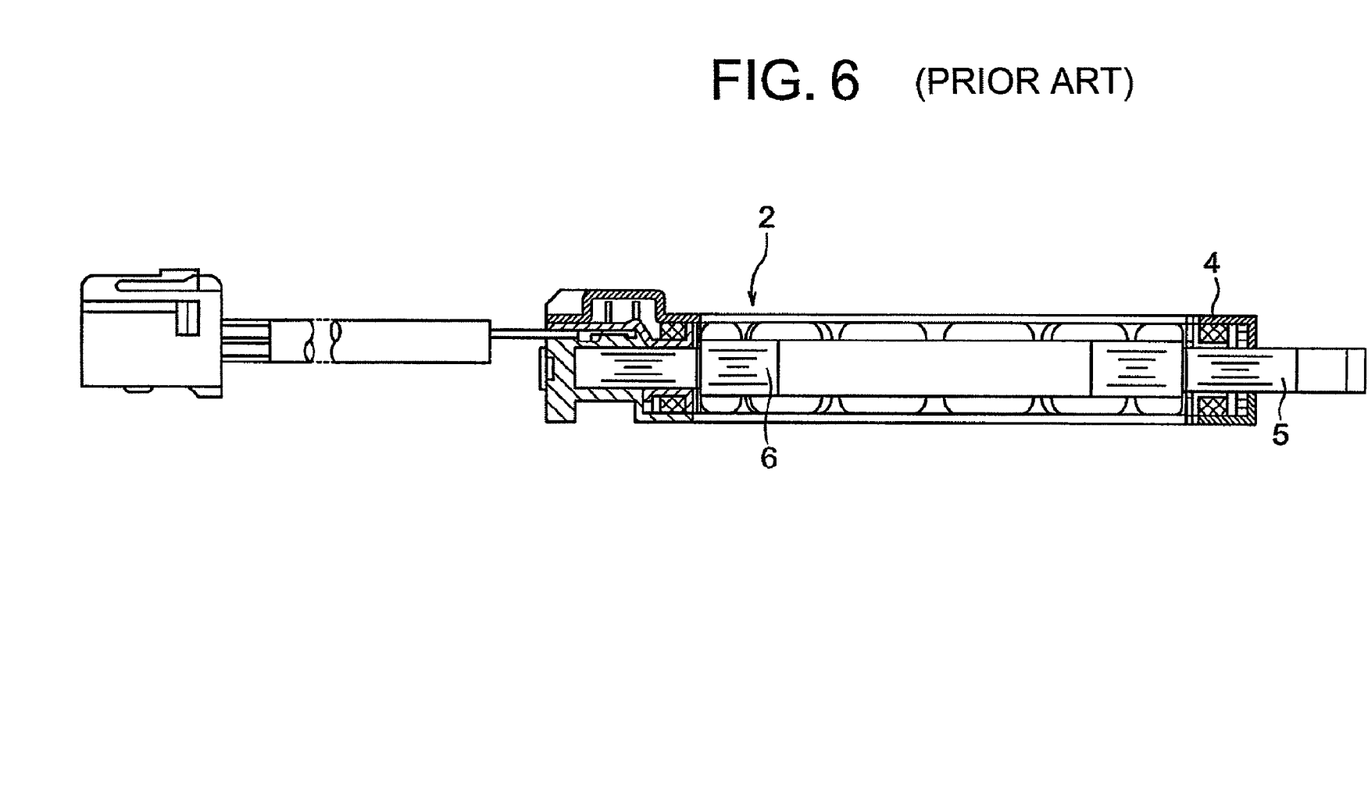
FIG. 6 is a sectional view of a conventional VR-type resolver.

An annular stator 5 having a resolver stator coil 4, and an annular rotor 6 provided within the stator 5 and having no coil are rotatably provided within a resolver portion 2 of the other conventional construction shown in FIG. 6.

Figure 8:
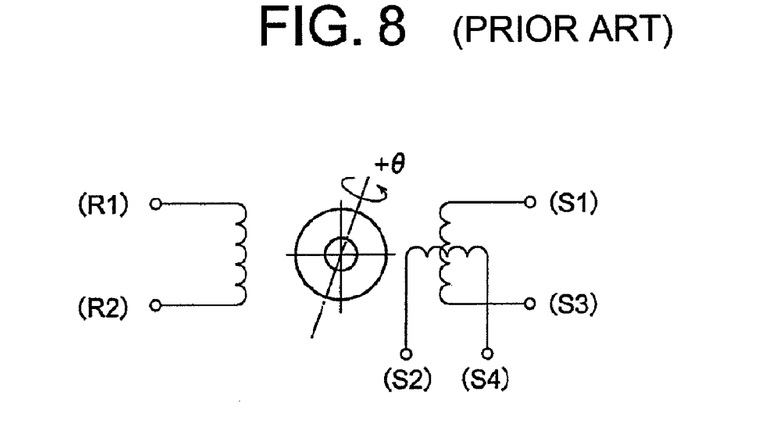
FIG. 8 is a wiring diagram showing a wire connection of a resolver.

Windings of the aforementioned resolver shown in FIGS. 4, 5, and 6 are constructed according to a wiring diagram shown in FIG. 8. As shown in FIG. 8, excitation windings R1 and R2 are single phase, and output windings S1 to S4 on a detection side are two phases.

Figure 7:
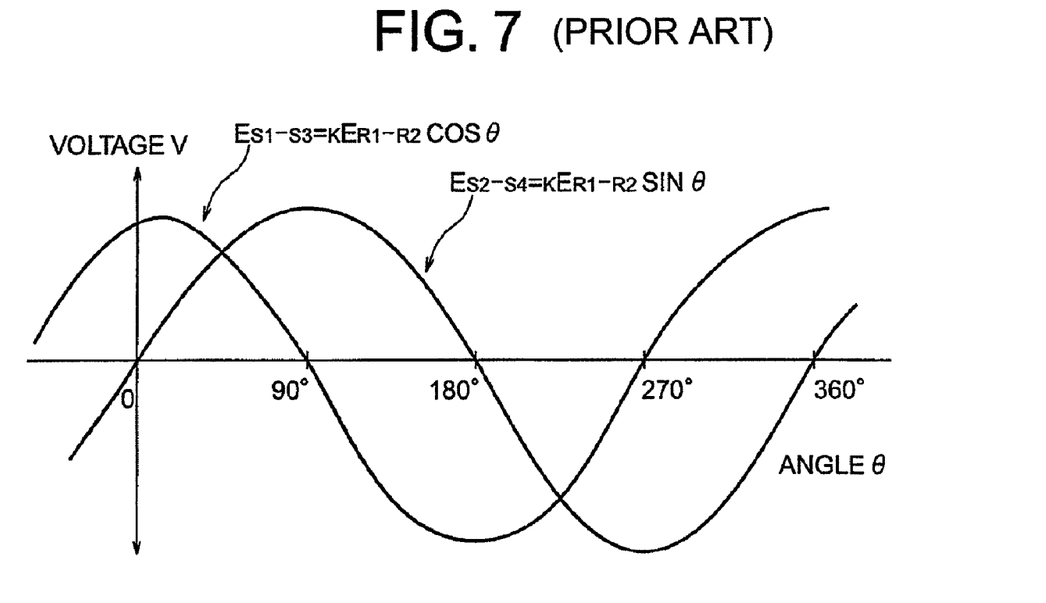
FIG. 7 shows output voltage curves and output voltage equations of a resolver.

Output voltage curves and output voltage equations obtained from the respective output windings S1 to S4 are shown in FIG. 7.

SUMMARY OF THE INVENTION

The conventional thin resolvers are constructed as described above, and hence have the following problems.

That is, in the conventional construction disclosed in FIGS. 4 and 5, the resolver portion and the rotary transformer portion are superposed on each other in the axial direction, so the resolver itself is thick (with a minimum thickness of 16 mm). As a result, it is extremely difficult to obtain a thin type resolver.

In the other conventional construction of FIG. 6, only the resolver stator coil is required as a coil. However, the resolver stator coil wound around the stator protrudes from both surfaces of the stator, so an insulating cover for insulating this resolver stator coil, a coil cover, and the like are required. The mounting of those components on the stator leads to an increase in thickness (with a minimum thickness of 10 mm). As a result, as in the foregoing case, it is extremely difficult to obtain the thin type of resolver. Further, the lack of a coil on the rotor imposes a certain limit to detection accuracy.

In each of the conventional constructions, detection of rotation is carried out based on a change in permeance of a gap between the outer periphery of the rotor and the inner periphery of each magnetic pole of the stator, so the occurrence of vibrations of a rotary shaft has an influence on gap fluctuations.

The stator has an integral construction, so the distribution of a magnetic field generated by the excitation windings is affected by mechanical positions of rotor poles serving for detection.

An angle detector according to the present invention includes: an annular stator board made of a non-magnetic material; a plurality of stators provided on the annular stator board independently of one another and forming slots at constant or various intervals; a winding magnetic core formed protrusively on each of surfaces of the stators; stator windings formed around the winding magnetic cores and composed of excitation windings and output windings; a magnetic flux return path plateau provided protrusively on each of the surfaces of the stators and provided inward or outward of the stator windings; an annular rotor board provided rotatably on the magnetic flux return path plateaus and facing and remaining out of contact with the stator windings; and a gap forming board provided on an inner surface of the annular rotor board and having a board inner surface whose protrusion state changes according to a waveform, and has a structure in which the annular rotor board rotates to cause changes in a gap between each of the winding magnetic cores and the board inner surface of the gap forming board.

Further, the angle detector of the present invention has another structure in which the board inner surface of the gap forming board has a curved surface, which changes according to a sinusoidal waveform, formed thereon along a rotational direction.

Still further, the angle detector of the present invention has another structure in which the stator windings are constituted of one member selected from the group consisting of: sheet coils; printed circuit board coils; and alignment windings.

Yet further, the angle detector of the present invention has another structure in which the gap forming board has a curved surface that is formed on a plurality of periods.

Furthermore, the angle detector of the present invention has another structure in which the annular rotor board is provided therein with a permanent magnet or the board inner surface is provided with the permanent magnet.

Moreover, an angle detector of the present invention includes a multiple number of the angle detectors, which are superposed on one another in an axial direction.

The angle detector according to the present invention is constructed as described above and hence makes it possible to obtain the following effects.

That is, stator windings having winding magnetic cores are provided on a plurality of stators disposed independently of one another on an annular stator board via slots, the stators are provided with an annular rotor board via a gap such that the annular rotor board can rotate face to face with the stators, and an angular signal is detected from a change in the gap resulting from rotation of the annular rotor board. Thus, a thin type of angle detector according to a face-to-face construction can be obtained.

The respective stators are separated from one another, so respective amounts of magnetic interference with the stator windings adjacent thereto are small. As a result, an improvement in detection accuracy can be achieved.

The stators are provided with magnetic flux return path plateaus, so the distribution of magnetic fluxes in each of the stators is stabilized. As a result, a contribution to an improvement in detection accuracy is possible.

DETAILED DESCRIPTION OF THE INVENTION

It is an object of the present invention to provide an angle detector of ultrathin type having a construction in which stator windings are provided on a plurality of stators disposed on an annular stator board via slots and the stators are provided with an annular rotor via a gap such that the annular rotor can rotate face to face with the stators so as to allow detection of an angular signal from a change in the gap resulting from rotation of the annular rotor board.

A preferred embodiment of an angle detector according to the present invention will be described hereinafter with reference to the drawings.

The following description will be given with the same reference symbols assigned to components identical or equivalent to those of the conventional embodiment.

Figure 1:
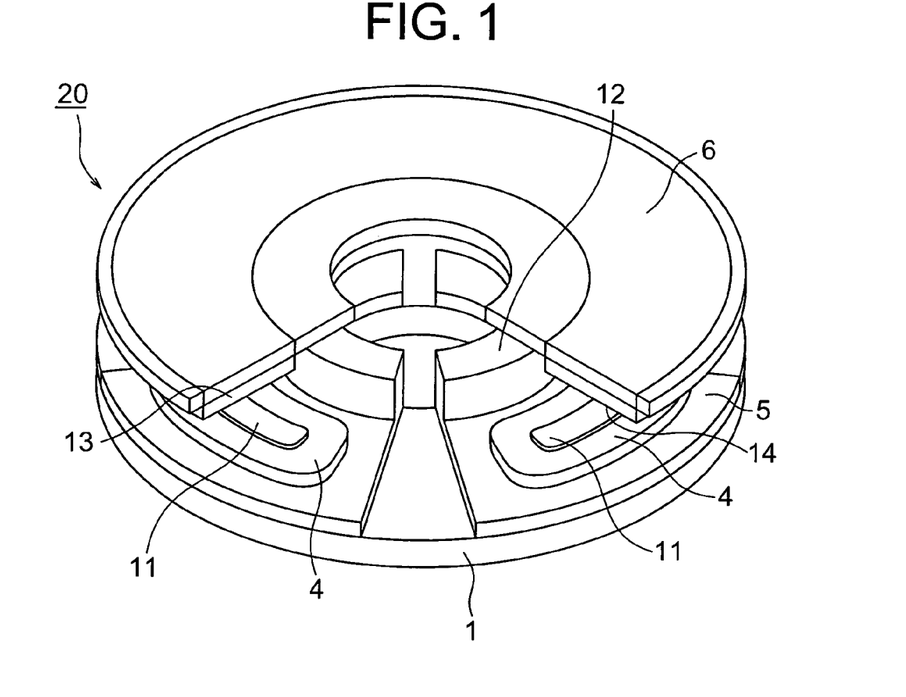
FIG. 1 is a partially cutaway perspective view showing an angle detector according to the present invention.

Referring to FIG. 1, an annular stator board made of a non-magnetic material is denoted by a reference symbol 1. A plurality of independent stators 5, which form slots 10 at constant or various intervals, are provided on a surface of the annular stator board 1.

The magnetic cores 11 made of a magnetic material are each formed protrusively on the stators 5. Stator windings 4, which are constituted of any of known sheet coils, known printed circuit board coils, known alignment windings, or the like and have a double-layer structure composed of excitation windings 4a and output windings 4b or the like, are provided around the magnetic cores 11.

Figure 2:
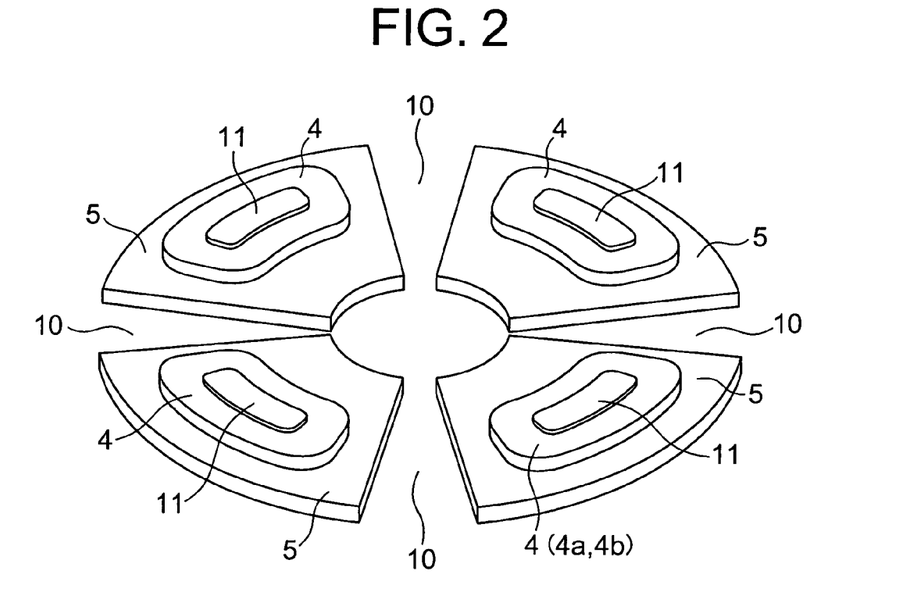
FIG. 2 is a perspective view showing respective stators of FIG. 1.

The respective stators 5 are independent of one another via the slots 10 and each assume the shape of a fan or a rectangle as a whole. Annular magnetic flux return path plateau 12, which assume the shape of a protruding strip and are made of a magnetic material, are each provided inward of the stator windings 4 with a predetermined height in the axial direction so as to play the role of a magnetic flux return path. That is, the magnetic flux return path plateaus 12 prevent crosstalk of magnetic fluxes and hence contribute to an improvement in detection accuracy.

The magnetic flux return path plateaus 12 are provided inward on the stators 5. However, the same operation as described above is obtained even when the magnetic flux return path plateaus 12 are disposed outward of the stator windings 4.

Figure 9:
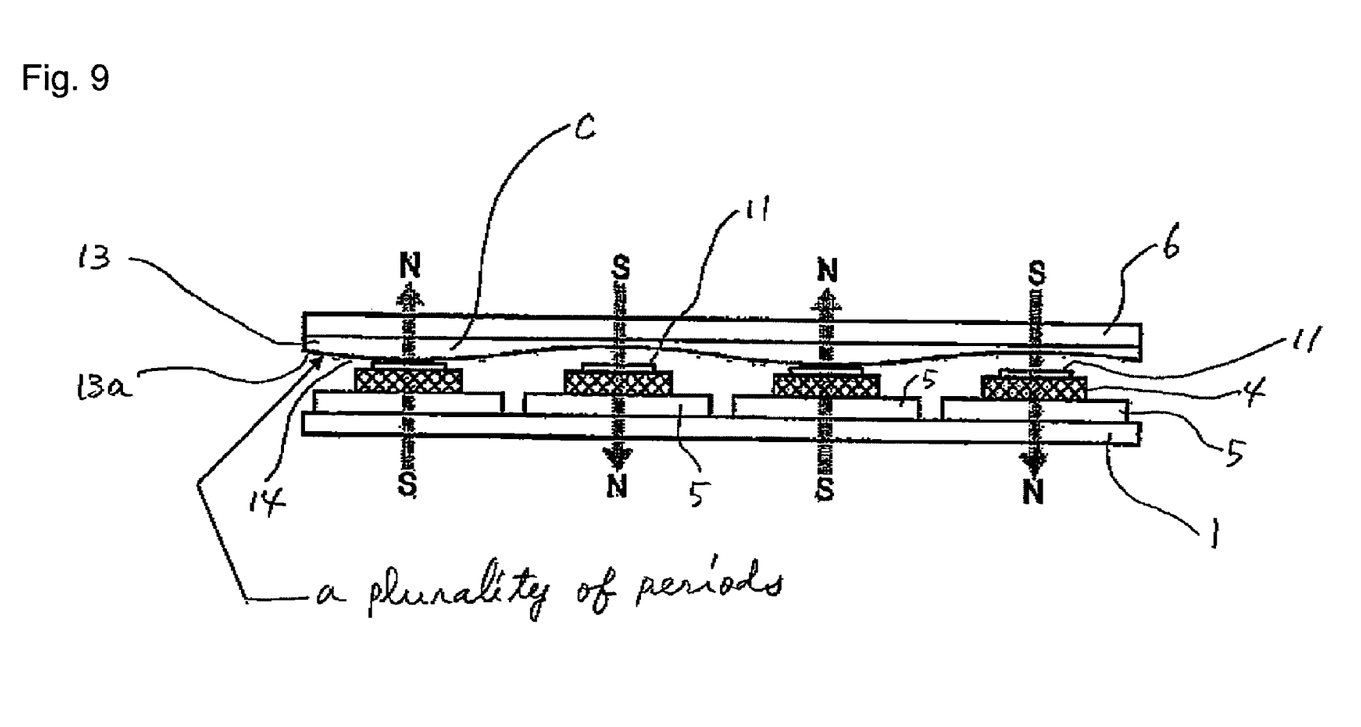
FIG. 9 is a side view of the angle detector showing a corrugated curved surface on an inner surface of an annular gap forming board.
Figure 10:
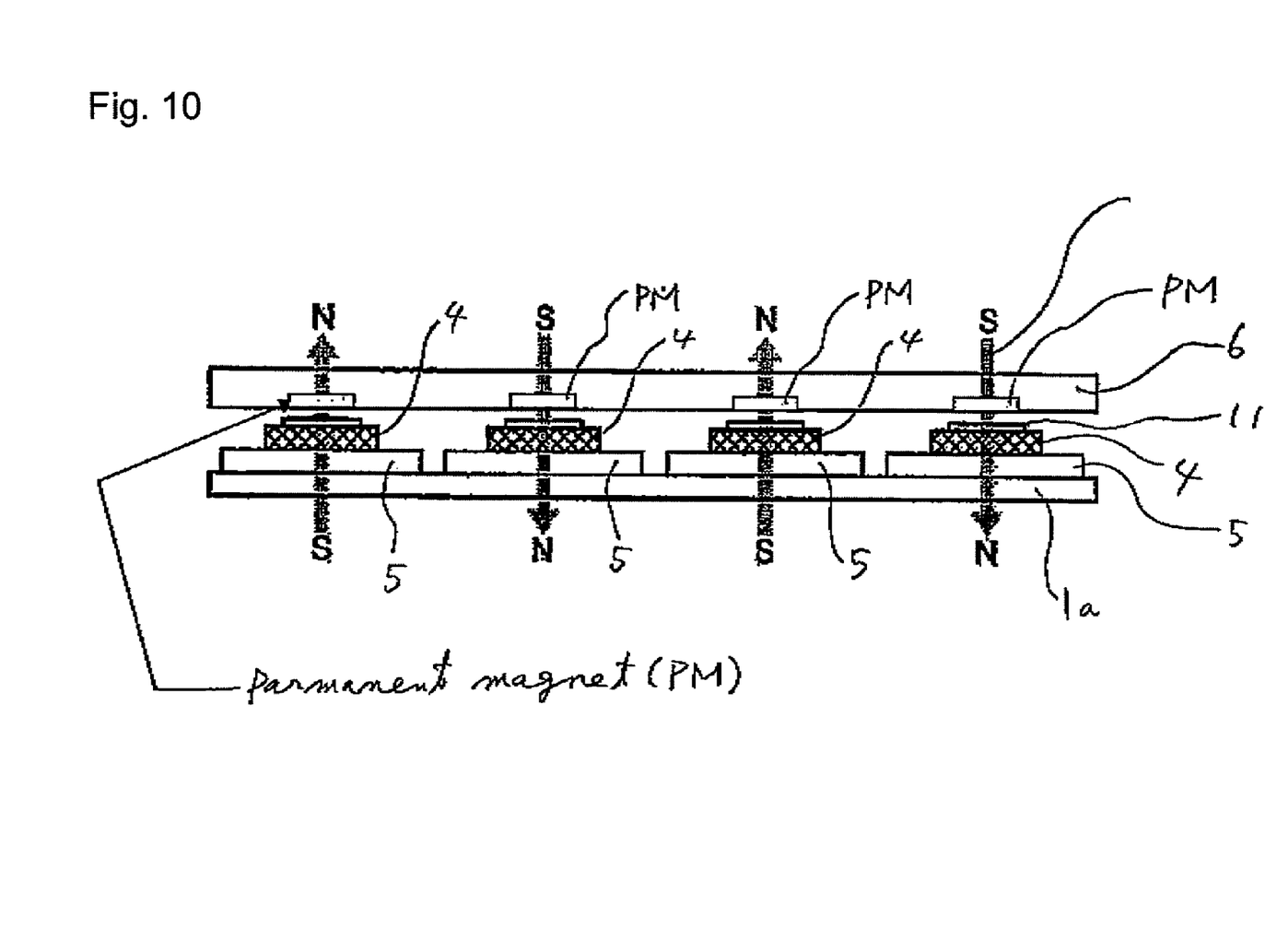
FIG. 10 is a side view of the angle detector with permanent magnets provided in an annular rotor board.

An annular rotor board 6 is provided rotatably on surfaces of the magnetic flux return path plateaus 12 in such a manner as to slide with respect thereto and remain out of contact with the stator windings 4. A corrugated curved surface C (see FIG. 9) with a sinusoidal waveform is formed along a rotational direction on a single cycle (period) or a plurality of cycles (periods) on a board inner surface 13a of an annular gap forming board 13 provided into an inner surface 6a of the annular rotor board 6. An annular gap 14, which is accompanied by changes in the shape of protrusion of the waveform, is formed between the board inner surface 13a of the gap forming board 13 and the magnetic cores 11 of the stators 5. If a permanent magnet PM (see FIG. 10) is provided inside the annular rotor board 6 or permanent magnets (not shown) are provided on opposed surfaces of the annular rotor board 6, a further improvement in detection sensitivity can be achieved.

Then, in the above-mentioned construction, when the annular rotor board 6 is rotated with the respective four excitation windings 4a supplied with excitation signals, the shape of protrusion of the waveform of the board inner surface 13a facing the magnetic cores 11 of the stators 5 changes (a magnetic action similar to changes in gap permeance in the known variable reluctance-type (VR-type) resolver), so sinusoidal changes in voltage corresponding to those changes in the shape of protrusion are obtained from the output windings 4b as an output signal (a resolver output).

The number of the stators 5 (number m of poles) and the number of cycles of the curved surface on the board inner surface 13a (cycle n) can be set in accordance with an intended purpose and the like of the angle detector.

A thickness t of the axial direction of an angle detector 20 of FIG. 1 mentioned above is 4 mm in an experimental prototype as well. This thickness t is about a quarter of the thickness of the angle detector according to each of the conventional constructions. In consequence, an angle detector of ultrathin type can be obtained.

Figure 3:
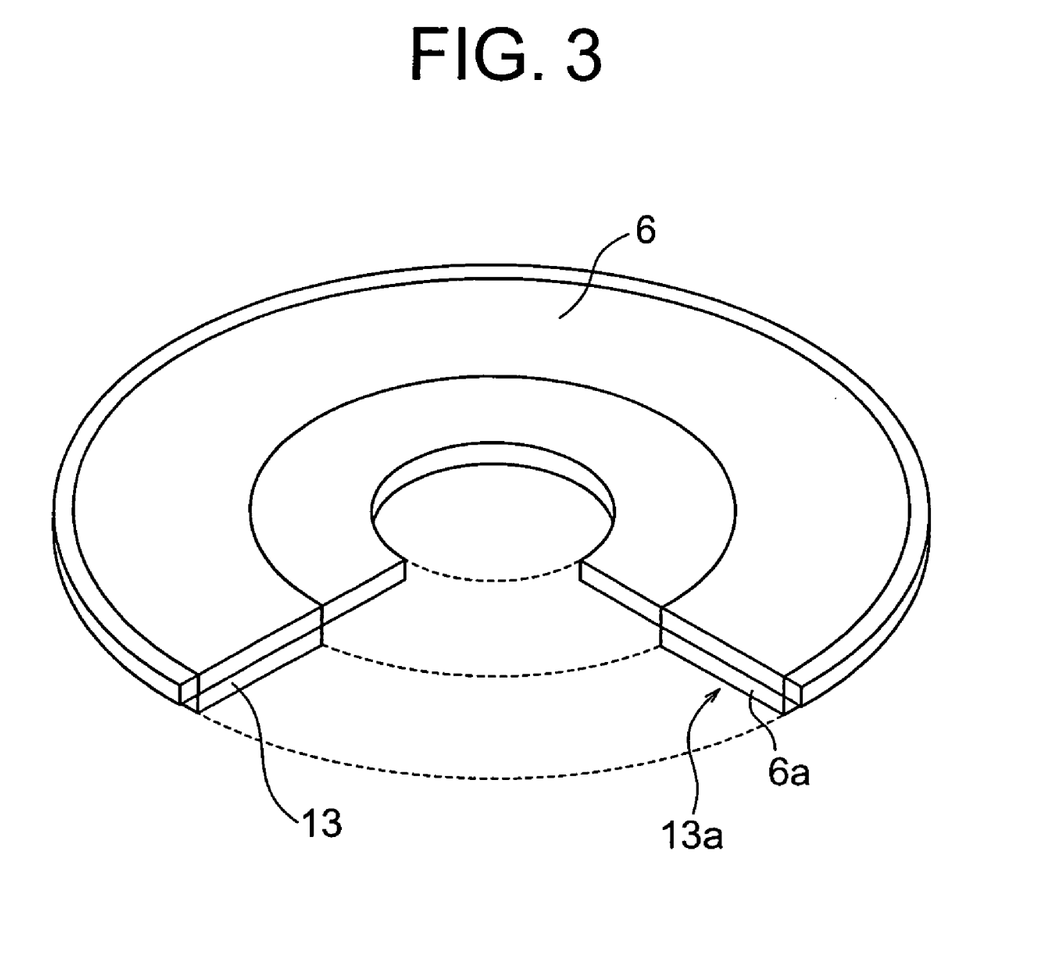
FIG. 3 is a partially cutaway perspective view showing an annular rotor board of FIG. 1.

In each of FIGS. 1 and 3 mentioned above, the annular rotor board 6 is partly illustrated as a cross-sectional view for convenience of explanation. In fact, however, the annular rotor board 6 is formed completely annularly.

The invention claimed is:

1. An angle detector, comprising:
   an annular stator board made of a non-magnetic material;
   a plurality of stators provided on the annular stator board independently of one another and forming slots at constant or various intervals;
   a magnetic core formed protrusively on each of surfaces of the stators;
   stator windings formed around the magnetic cores and composed of excitation windings and output windings;
   a magnetic flux return path plateau provided protrusively on each of the surfaces of the stators and provided inward or outward of the stator windings;
   an annular rotor board provided rotatably on the magnetic flux return path plateaus and facing and remaining out of contact with the stator windings; and
   a gap forming board provided on an inner surface of the annular rotor board and having a board inner surface whose protrusion state changes according to a waveform,
   wherein the annular rotor board rotates to cause changes in a gap between each of the magnetic cores and the board inner surface of the gap forming board.

2. An angle detector according to claim 1, wherein the board inner surface of the gap forming board has a curved surface, which changes according to a sinusoidal waveform, formed thereon along a rotational direction.

3. An angle detector according to claim 1, wherein the stator windings are constituted of one member selected from the group consisting of: sheet coils; printed circuit board coils; and alignment windings.

4. An angle detector according to claim 1, wherein the protrusion state of the board inner surface changes according to a waveform formed in a plurality of periods.

5. An angle detector according to claim 1, wherein the annular rotor board is provided therein with a permanent magnet or the board inner surface is provided with the permanent magnet.

* * * * *